United States Patent [19]

Kochy et al.

[11] Patent Number: 4,582,156

[45] Date of Patent: Apr. 15, 1986

[54] PRE-ASSEMBLED MODULE FOR THE COCKPIT AREA OF MOTOR VEHICLES, PARTICULARLY PASSENGER CARS

[75] Inventors: Fritz Kochy, Mainz; Gerhard Helmsing, Eppstein, both of Fed. Rep. of Germany

[73] Assignee: General Motors Corporation, Detroit, Mich.

[21] Appl. No.: 640,968

[22] Filed: Aug. 15, 1984

[30] Foreign Application Priority Data

Aug. 20, 1983 [DE] Fed. Rep. of Germany ....... 3330140

[51] Int. Cl.$^4$ ..................... B60K 26/00; B60K 37/00; B62D 25/14; B62D 65/00
[52] U.S. Cl. ........................................ 180/90; 296/72; 296/194; 296/197
[58] Field of Search ............................ 180/11, 12, 90; 296/70–74, 192, 197, 29, 191, 194

[56] References Cited

U.S. PATENT DOCUMENTS

| | | | |
|---|---|---|---|
| 4,126,202 | 11/1978 | Hern | 180/90 X |
| 4,391,465 | 7/1983 | Piano | 296/192 X |
| 4,432,565 | 2/1984 | Suziki | 180/90 X |

FOREIGN PATENT DOCUMENTS

| | | | |
|---|---|---|---|
| 81656 | 6/1983 | European Pat. Off. | 180/90 |
| 466214 | 5/1937 | United Kingdom | 180/12 |

*Primary Examiner*—Robert G. Nilson
*Attorney, Agent, or Firm*—William A. Schuetz

[57] ABSTRACT

This disclosure relates to an automotive vehicle having a preassembled module for the cockpit region thereof. The preassembled module includes a base which forms the fire wall of the vehicle and to which engine compartment accessories are preassembled, and a dashboard mounted to the base and to which passenger compartment accessories are preassembled. The module is connected to the vehicle by lowering the same through the windshield of the vehicle. The module at its ends and the side pillars of the vehicle have complementary mounting plate means which cooperate with each other to automatically center the module on the vehicle and the module is connected to the vehicle via mounting bolts which extend transversely of the vehicle and which connect the mounting plate means together.

7 Claims, 3 Drawing Figures

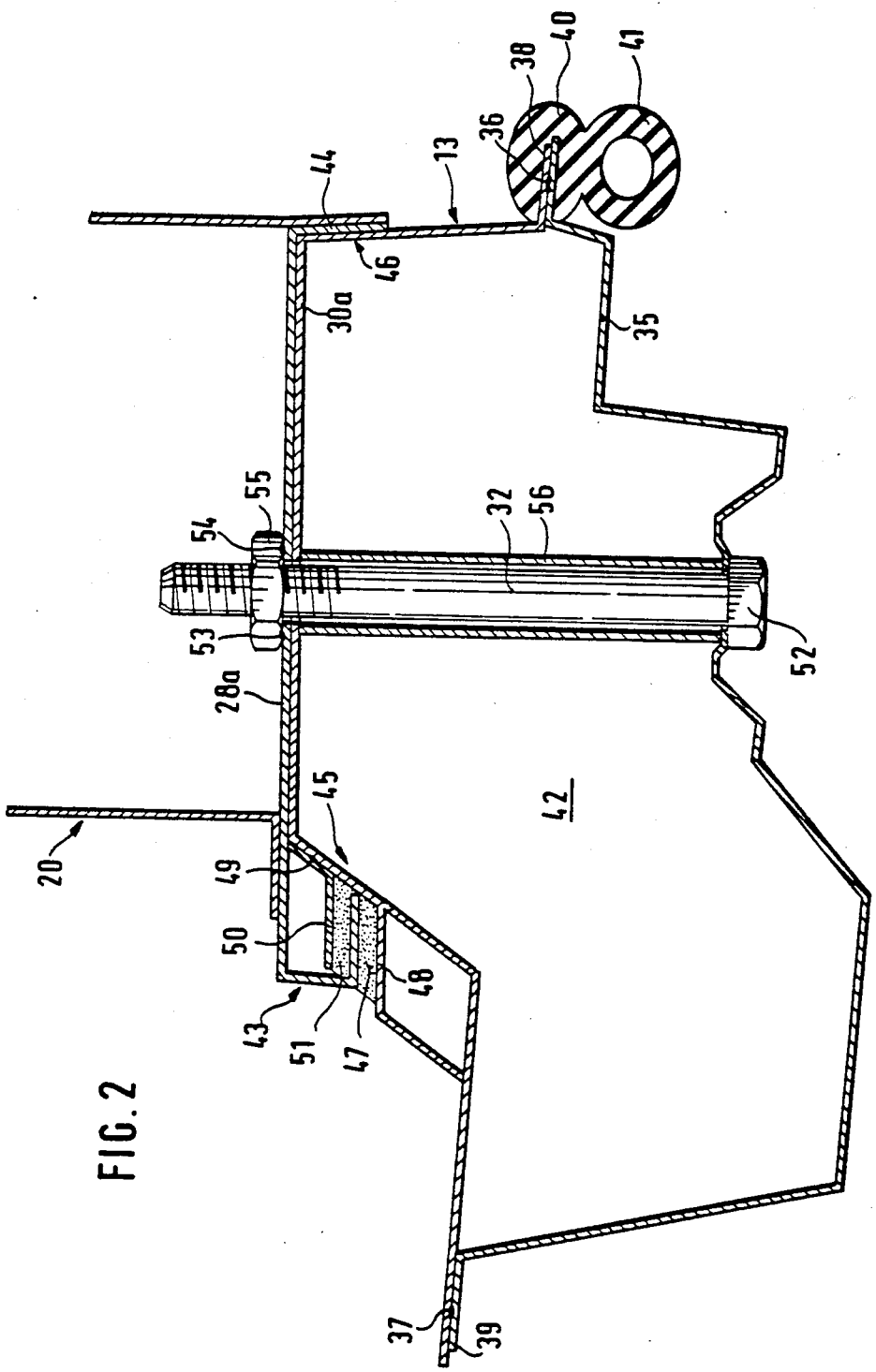

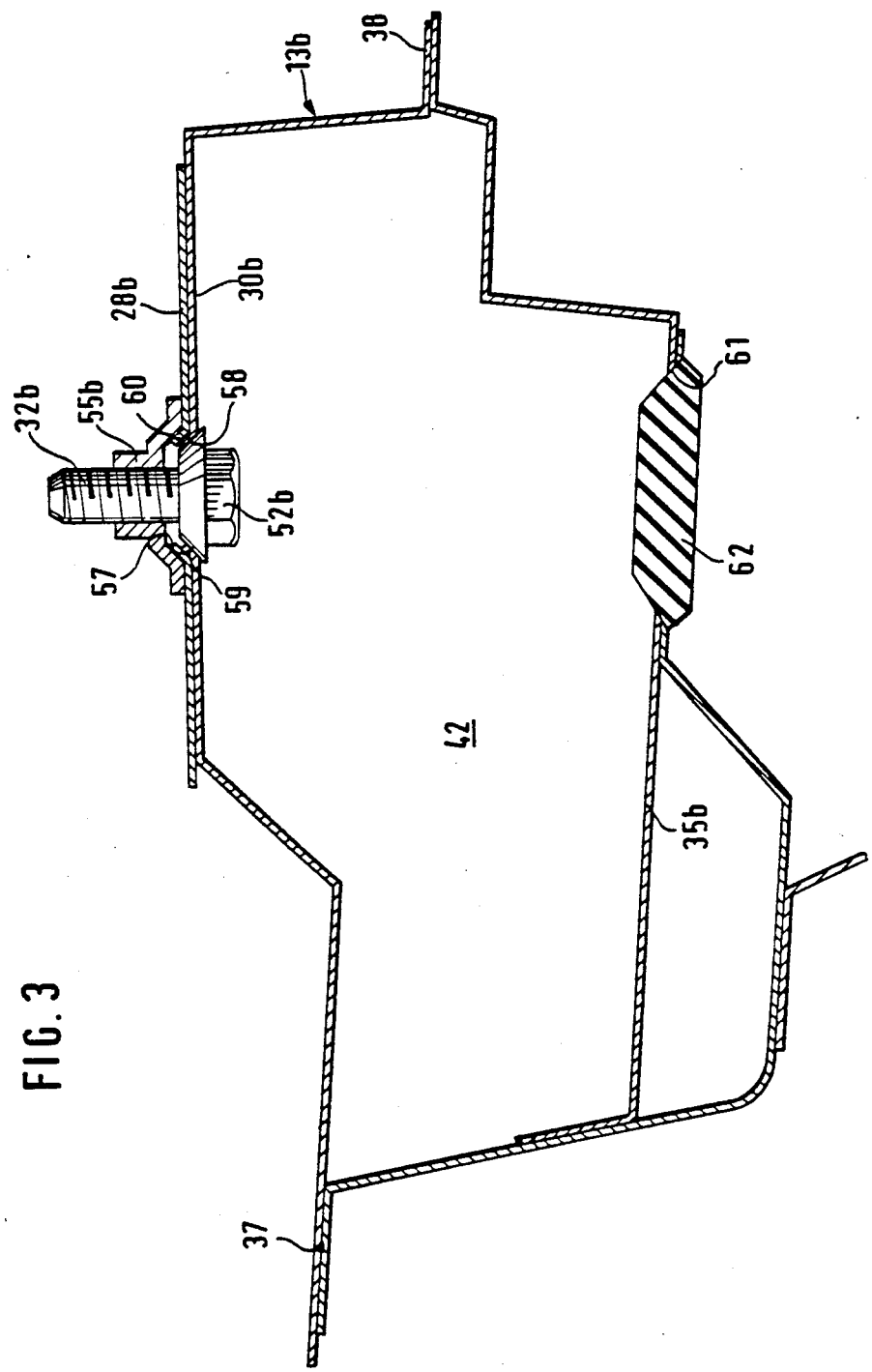

PRE-ASSEMBLED MODULE FOR THE COCKPIT AREA OF MOTOR VEHICLES, PARTICULARLY PASSENGER CARS

The invention relates to a pre-assembled module for the cockpit area of a motor vehicle, especially a passenger car, which can be mounted as a unit inside the vehicle body and which incorporates essentially the following components: an instrument panel including all instruments and accessories commonly contained therein, fuse box and electrical wiring, heater including controls and air distribution system, antenna; furthermore a steering system including a steering wheel, steering mechanism, steering column enclosure and steering support means; as well as brake, clutch and accelerator pedals including their respective mounting brackets; servo brake unit, windshield wiper system, heater fan, climate system, etc. The vehicle body includes a fire wall with a fire wall support member (so-called steering cross member) to which the aforementioned components are directly or indirectly connected when in the installed position. The fire wall and the fire wall support member are separated from the body shell and serve as a mounting base for the pre-assembled module, with the fire wall and fire wall cross member being adapted for sealing connection with respective body side panels when the module is in the installed position, in accordance with patent application P No. 33 15 646.8-21, which corresponds to a U.S. patent application Ser. No. 601,446, filed Apr. 18, 1984, in the names of F. Kochy, K. Brandel, H. Hullmann, B. Neumann and G. Helmsing and assigned to the same assignee as the present application.

In the exemplary embodiments disclosed in the main patent, the pre-assembled module is secured to the adjacent body panels by means of longitudinal positioned bolts. This arrangement requires that the two A-pillars, which are the members of principal support, be provided with mounting stubs which project inwardly of the body, thereby reducing the structural width and forming an obstruction in the installation area provided for the blower of the heating and air conditioning system.

It is the object of the present invention to expand on the basic concept disclosed in the main patent and to provide means whereby the foregoing problem, namely that of constricting the structural width and installation space, is eliminated.

This object is accomplished in accordance with the present invention in that the fire wall cross member has a mounting plate secured to each of its ends adjoining the side panels of the body, and in that the mounting plates together with the fire wall cross member are adapted to be threadedly attached to the respective A-pillars by means of threaded bolts disposed transversely of the vehicle.

In comparison to a longitudinal extending threaded connection, the advantages of the arrangement according to the present invention are as follows:

The connecting means required in the past in the form of inwardly projecting mounting stubs on the A-column are not needed any more. This, obviously, represents a substantial benefit in terms of cost and weight savings. A torsionally rigid mounting of the fire wall cross member is provided. The width of the body can be controlled more accurately, because it is dependent only on the length tolerances of the fire wall cross member. More accurate fits are possible for the windshield opening and the hood, which results in an overall improvement in quality. The space gained between the A-pillars enables the installation of a heating and cooling blower having a higher efficiency and a greater air flow rate.

The invention will now be described in conjunction with representative embodiments illustrated in the drawings, wherein:

FIG. 2 is a horizontal sectional view through the left A-pillar of the vehicle (Section II—II in FIG. 1), the mounting bolt shown separately in FIG. 1 being in the installation position, and FIG. 3 is an alternate embodiment, its cross-sectional representation corresponding to that of FIG. 2.

Figure 1:
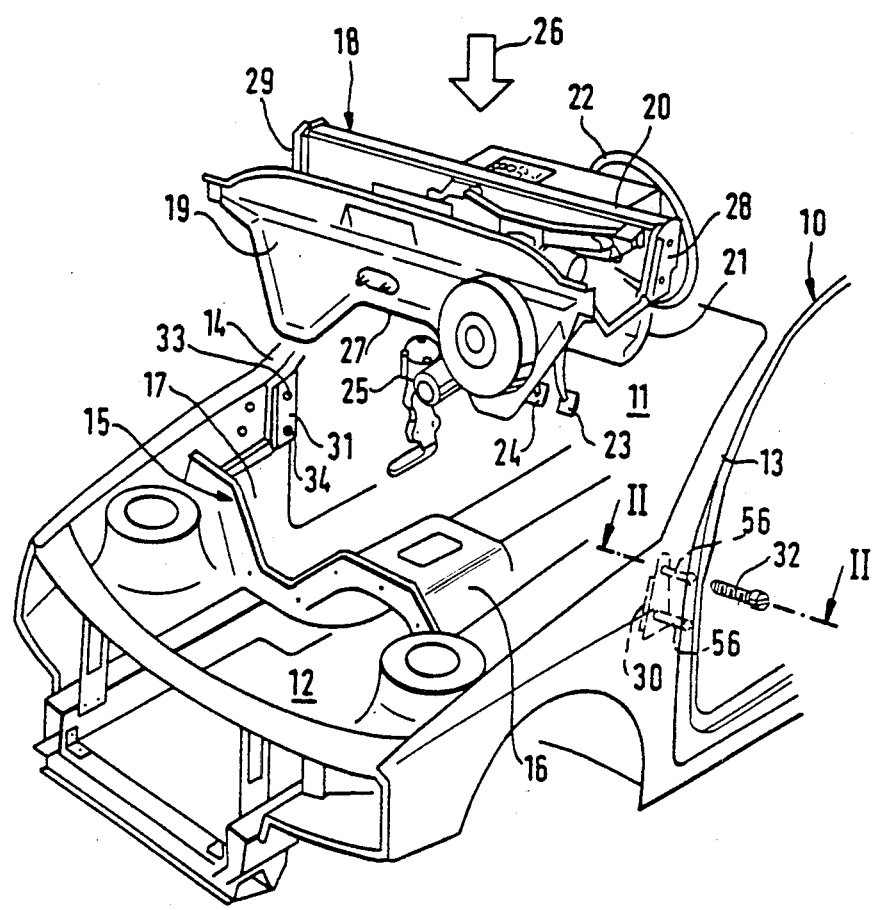
FIG. 1 is a perspective view of the front portion of a passenger car body.

Referring to FIG. 1, numeral 10 denotes a pre-assembled body shell of a passenger car. An opening in the body 10 provided for the windshield is designated by the numeral 11. The engine compartment which is open at the top (prior to installation of the hood) is designated by the numeral 12. The A-pillars, which form the lateral boundaries of the windshield opening, are denoted by the numerals 13 and 14. One will also notice inside the body shell a substructure 15 and the transmission tunnel 16 as well as the walls 17.

Also shown in FIG. 1 is the pre-assembled unit 18, which is illustrated in a suspended position (without the supporting rig) immediately above the body shell 10. This unit is the cockpit station of the vehicle, sometimes also termed the cockpit module. One important component of the unit 18 is the fire wall 19, because it serves as an assembly base, and the transversely extending fire wall support member 20 positioned above the fire wall 20. The fire wall 19 and fire wall support member 20, which are normally part of the body shell 10, are initially separated from the body and retained on a separate assembly line (not shown) together with the pre-assembled unit 18, so as to serve also as a support frame for said unit.

FIG. 1 illustrates, furthermore, a number of other components which make up the pre-assembled cockpit unit: instrument panel 21, steering wheel 22, clutch pedal 23, brake pedal 24, steering mechansim 25, etc. A complete listing of the parts, components and control elements contained in the pre-assembled unit 18 can be found in the text of the main patent (patent application P No. 33 15 646.8-21). Thus it should be noted that the unit 18 not only incorporates components disposed in the cockpit area of the vehicle occupant compartment, but also components situated on the other side of the fire wall, i.e., in the engine compartment.

The installation of the pre-assembled unit, which is illustrated in FIG. 1 suspended above its final position, starts from the top and proceeds downwardly (direction of arrow 26), i.e., the unit is lowered through the opening 11 provided for the windshield and through the engine compartment 12. As apparent from the contours of the fire wall 19, especially in FIG. 1 (one should take notice especially of the cutout 27 for the transmission tunnel), the fire wall 19, when in the installed position, abuts against the adjacent walls, e.g. 17, of the vehicle substructrue 15 and will be fixedly connected therewith.

It is also apparent from FIG. 1 that the fire wall cross member 20 has a pair of mounting plates 28, 29 attached to its respective end portions adjoining the body side panels A-pillars 13, 14. In the installed position of the unit 18, the mounting plates 28, 29 will engage, respectively, with the inwardly disposed plates 30, 31 of the associated A-pillars 13, 14. The unit 18 is fastened and retained in its mounting position through threaded connection by means of threaded bolts disposed transversely of the vehicle, one such bolt being illustrated in FIG. 1 and denoted by the numeral 32. For this purpose, the inwardly positioned plates 30, 31 of the A-pillars 13, 14 are provided, respectively, with a pair of through bores 33, 34 disposed above one another for receiving the mounting bolts 32.

FIG. 2 illustrates, on an enlarged scale as compared to FIG. 1, one exemplary embodiment of a mounting plate, which is denoted here by the numeral 28a. FIG. 2 also illustrates one possible arrangement of attaching the mounting plate 28a to the associated inwardly disposed sheet metal member 30a of the left A-pillar 13. It is apparent from FIG. 2 that the A-pillar 13 is, as is typical, comprised of the previously mentioned sheet metal wall 30a and an outer wall designated by numeral 35. The two sheet metal walls 30a, 35 forming the A-pillar 13 are spot-welded at 36 and 37, respectively, and are thus forming flanges 38, 39. Flange 38 is provided with a slip-on cover 40 including a door sealing strip 41 of annular cross-section that is integrally formed thereto. The space inside the A-pillar is denoted by the numeral 42.

As is also apparent from FIG. 1 and especially FIG. 2, the contours of the mounting plates 28, 28a and 29 conform to the shapes of the respective A-pillars 13 and 14, so that the unit 18 is automatically aligned with the body 10 while being mounted thereto. As illustrated in FIG. 2, the forward and rearward end portions of the mounting plates, in this instance mounting plate 28a, are in the form of angled extensions 43, 44, respectively. These extensions 43, 44 are partially embracing shoulders 45, 46, respectively, of the A-pillar. As indicated in FIG. 1, the inwardly disposed plates 30, 31 of the A-pillars 13, 14 are arranged in a downwardly converging position. The angle of inclination of the mounting plates 28 or 28a and 29 corresponds to the aforementioned inclined position of the associated inwardly disposed plates 30, 31 of the respective A-pillars 13 and 14. This arrangement will accomplish that the unit 18, as it is installed into the body shell, is automatically centered with respect to the longitudinal axial center line of the body 10.

Furthermore, the forward and rearward shoulders, denoted in FIG. 2 by the numerals 45 and 46, respectively, of the associated A-pillars 13 and 14, are also arranged in a downwardly diverging position. This will accomplish that, in cooperation with the associated mounting plates, e.g. 28a in FIG. 2, the unit 18 is also automatically centered in longitudinal direction when being installed into the body shell.

The embodiment illustrated in FIG. 2 is also characterized in that the mounting plate extension 43 cooperating with the forward shoulder 45 of the A-pillar 13 is bent rearwardly at an angle of about 180°, and is sealingly engaging a channel 47 formed on the front side of the forward shoulder 45. The forwardly open channel 47 is formed between a bent portion 48 of the forward A-pillar shoulder 45 and a correspondingly bent sheet metal member 50 spot-welded at 49 to shoulder 45. It is also apparent from FIG. 2 that the channel 47 is filled with a hardenable adhesive material 51, so as to function as a sealing channel and to establish a sealing joint between the members 28a and 30a or 13.

The aforementioned interrelationship between the members 43, 45 and 47-51 also causes the fire wall cross member 20 and the A-pillar, e.g. 13 in FIG. 2, to become, to a certain extent, interlocked with one another which, in the event of a collision, is an important feature because of the stability provided by the connection between the unit 18 and the vehicle body 10.

FIG. 2 also illustrates one possible arrangement of connecting the fire wall support member 20 and the A-pillars 13, 14. One will notice in this embodiment that the threaded bolt 32 used for fastening the mounting plate 28a, is extending completely through the A-pillar 13 from the outside toward the inside, and that the bolt head abuts against the outer wall 35 of the A-pillar 13. A threaded nut 55, which cooperates with the bolt 32, is provided inwardly of the mounting plate 28a and is welded thereto at 53, 54. It is apparent that, as the bolt 52 is being tightened, the walls 30a and 35 of the A-pillar would normally be pulled toward one another. In order to avert the deformation of the walls by these forces, a spacer 56 in the form of a bushing, which extends from the inner wall 30a to the outer wall 35, is located within the space 42. The spacer bushing 56 is disposed concentrically about the bolt 32. It should be understood that appropriate structural arrangements have also been made with respect to the other fastening bolts that are not illustrated in FIG. 2. The type of connection according to FIG. 2 is usually termed a two-shear connection.

FIG. 3 illustrates an alternate embodiment of a connection between the fire wall support member 20 and the A-pillar 13, and for the sake of simplicity, equivalent parts are designated by the same numerals. In this embodiment, a threaded nut 55b which is provided with a conical recess 57, is secured to the inside of the locking plate 28b. The inwardly disposed sheet metal member 30b of the A-pillar 13b and the locking plate 28b are defining an aperture 58 which is occupied by a threaded bolt 32b. The threaded bolt 32b cooperating with the nut 55b is provided with a head 52b having tapered surfaces 59. Upon tightening of the bolt 32b, the bolt head will engage the inwardly disposed sheet metal member 30b of the A-pillar 13b. Due to the tapered surface 59, the surface area of the locking plate 28b surrounding the bolt will be subjected to plastic deformation, as can be seen at 60 and, as a result, is forced into the conical recess 57 of the threaded nut 55b. This arrangement will provide a conical draw and ensure a solid connection between the parts 28b and 13b and thus between the unit 18 and the column 13.

To enable the bolts 32b to be placed into their respective installation positions, see FIG. 3, inside the A-pillar, e.g. 13b, the outer wall 35b is provided with respective apertures 61 that can be closed from the outside by a plug 62 made of rubber or a similar material.

The connection for the parts 28b and 13b illustrated in FIG. 3 is commonly termed a single-shear connection.

The embodiments of the invention in which an exclusive property or privilege is claimed are defined as follows:

1. In an automotive vehicle having a vehicle body shell including a pair of horizontally spaced generally vertically extending side pillars for receiving a windshield and body side and bottom support structure, a preassembled module comprising a base extending transversely of the vehicle body shell and which forms the fire wall of the vehicle to separate the engine compartment from the passenger compartment and to which various engine compartment accessories are preassembled, a dashboard with various vehicle accessories mounted thereto which are accessible from the passenger compartment and which is preassembled to said base, said module being connected as a unit to the vehicle body structure by lowering the same through the windshield opening, connecting means for connecting said module to said body shell and sealing means for sealing the module to said body shell, the improvement being that said connecting means comprises first mounting plate means secured to said module at its opposite ends and which face toward said side pillars and second mounting plate means secured to said side pillars and facing toward said first mounting plate means, said first mounting plate means having front and rear side extensions which are downwardly divergent and an inclined face and said second mounting plate means having front and rear shoulders which are downwardly divergent and an inclined face, said front and rear extensions and said faces of said first mounting plate means being shaped complementary with and cooperating with said front and rear shoulders and faces of said second mounting plate means when said module is lowered into position on said vehicle whereby said module is automatically centered transversely and longitudinally of said vehicle when connected thereto, and fastener means extending transversely of said vehicle body for securing said first and second mounting plate means together.

2. In an automotive vehicle as defined in claim 1 and wherein said faces of said first and second mounting plate means respectively converge toward each other in a downward direction.

3. In an automotive vehicle as defined in claim 2 and wherein the front extension of said first mounting plate means is reversely bent and has its free end received within a channel on said front shoulder of said second mounting plate means, and wherein said sealing means comprises a cured adhesive in said channel of said second mounting plate means.

4. In an automotive vehicle as defined in claim 1 and wherein said side pillars are generally box-shaped and said fastening means comprises bolts which extend through the side pillars and which have heads which engage the side pillars from their outside and spacers enclosing said bolts and located in the side pillars between their inside and outside surfaces.

5. In an automotive vehicle as defined in claim 4 and wherein said bolts extend through said second mounting plate means and are threadably connected with nuts welded to said first mounting plate means.

6. In an automotive vehicle as defined in claim 1 and wherein said side pillars are box-shaped and have aligned openings through their inside and outsides and said fastener means comprises bolts inserted through the opening in the outside of the side pillar and threadably connected with a nut on said first mounting plate means to secure the first and second mounting plate means together.

7. In an automotive vehicle as defined in claim 6 and wherein said opening in the outside of said pillar is closed by an elastic plug.

* * * * *